US006972870B2

(12) United States Patent
Koguchi

(10) Patent No.: US 6,972,870 B2
(45) Date of Patent: Dec. 6, 2005

(54) PRINTING METHOD AND PRINTING DEVICE

(75) Inventor: Hideyuki Koguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 883 days.

(21) Appl. No.: 09/854,667

(22) Filed: May 15, 2001

(65) Prior Publication Data

US 2001/0040687 A1 Nov. 15, 2001

(30) Foreign Application Priority Data

May 15, 2000 (JP) ............................ 2000-142047

(51) Int. Cl.[7] ............................................ G06F 15/00
(52) U.S. Cl. ........................................ 358/1.9; 358/1.8
(58) Field of Search .......................... 358/1.1, 1.8, 1.9, 358/3.1, 3.11, 3.12; 101/211, 483; 347/55

(56) References Cited

U.S. PATENT DOCUMENTS

| | | | | |
|---|---|---|---|---|
| 4,852,485 | A * | 8/1989 | Brunner | 101/211 |
| 5,476,043 | A * | 12/1995 | Okuda et al. | 101/483 |
| 2002/0146635 | A1 * | 10/2002 | Nagasaka et al. | 430/190 |
| 2002/0163560 | A1 * | 11/2002 | Ohsawa et al. | 347/55 |

* cited by examiner

*Primary Examiner*—Gabriel Garcia
(74) *Attorney, Agent, or Firm*—Sughrue Mion, PLLC

(57) ABSTRACT

In a printer, in order to compensate for non-uniformity of one of or both of film thickness of each pixel by an ink applying characteristic of the printer and fluctuations over time of a surface area, as well as to compensate for positional non-uniformity, new image data is generated from original image data and from the ink applying characteristic of the printer. Even if ink is supplied in a constant amount, an image is formed without non-uniform density. The printer has a simple structure in which a single dam plate (ink key) is provided along an axial direction of an ink moving roller. In ink supply control, a degree of opening of the dam plate is always a constant degree of opening, and an amount of ink supplied per unit time is a constant amount.

26 Claims, 4 Drawing Sheets

PRINTING METHOD AND PRINTING DEVICE

BACKGROUND OF THE INVENTION

1. Field of the Invention

The present invention relates to a printing method and a printing device which, on the basis of digital image information of an original image, form an image onto a printing plate, supply ink to the printing plate, and transfer the image onto a pressure drum so as to carry out printing.

2. Description of the Related Art

In conventional printing technologies, an original is superposed on a printing plate, and the image is formed on the printing plate by exposure. Thereafter, the printing plate is wound onto a plate drum of a printing device, ink is supplied, and printing is carried out.

On the other hand, in recent years, technology has been changing over to so-called digital exposure systems in which, with a printing plate wound on a plate drum, an image is recorded on the printing plate on the plate drum on the basis of digital image data read from an original.

In a digital exposure system, by analyzing digital image data in advance, the state of the image (the gradations of the density) can be ascertained, and thus, the amount of ink can be accurately controlled. More specifically, ink keys are provided such that the plate drum is divided into plural regions along the axial direction thereof, and the ink keys can control the amount of ink for each of the divisional, circumferential director, strip-shaped regions. The ink key carries out seesaw operation, such as in the case of a piano keyboard, such that the opening and closing of an ink flow path from an ink container is possible.

Thus, by controlling the opening and closing of the respective ink keys independently on the basis of the image data at the strip-shaped regions of the plate drum, the appropriate amount of ink can be supplied to each region of the image.

However, control of the ink keys is complicated, and a mechanism for independently controlling the opening and closing of the plural ink keys is needed. Thus, a large number of parts is required, which presents a great obstacle to making the printing device more compact and more simple.

In addition to the problem of higher costs resulting from the complex mechanism required for the ink keys, ink keys have another drawback in that fine control corresponding to an image cannot be carried out because the number of ink keys is limited due to limitations of the aforementioned mechanism. Further, there is a problem in that control of the ink in the rotating direction of the drum cannot be carried out at a speed corresponding to the rotational speed of the drum.

SUMMARY OF THE INVENTION

In view of the aforementioned, an object of the present invention is to provide a printing method and a printing device in which, without providing a plurality of ink keys along the axial direction of a plate drum and by merely opening and closing a single key plate which covers the entire axial direction region of the plate drum, appropriate amounts of ink corresponding to density gradations of an image can be supplied.

A first aspect of the present invention is a method for printing an image in accordance with digital image information representing the image, the method comprising the steps of (a) mounting a printing plate on a plate drum; (b) supplying ink at a substantially constant rate to the printing plate; (c) generating surface area modulation data based on at least one of dot surface areas from the digital image information, and an ink film thickness on the printing plate due to the substantially constant rate of ink; (d) producing revised image data based on the surface area modulation data corresponding to at least one of ink supply rate for adjusting ink film thickness and dot surface areas; and (e) printing an image according to the revised image data by at least of one of adjusting ink supply rate and exposing an image on the printing plate.

In accordance with the first aspect, during normal printing, density of an image is expressed by one of or both of the film thickness (coating thickness or the like) of the ink and the dot surface area. If ink can be supplied by finely dividing the image region along the axial direction of a plate drum, an amount of ink can be supplied such that the film thickness and/or the dot surface area correspond to the density of the image. However, in a case in which a constant amount of ink is supplied along the axial direction of the plate drum, the amount does not correspond to the film thickness and/or the dot surface area, and thus, regions of insufficient density and regions of excess density will arise.

Thus, in the first aspect of the present invention, at least one of film thickness and dot surface area of each of predetermined regions is determined from digital image information. Surface area modulation data, which corresponds to the constant amount of ink, is generated from the film thickness and/or dot surface area of each of the predetermined regions. Namely, the density, which is expressed by the film thickness and/or the dot surface area, is converted into image data such that the density is expressed by an extent of dot surface areas under the condition of a given, constant film thickness. In this way, even if the film thickness and/or the dot surface area is constant, because the density is expressed by the surface area, an appropriate image can be formed even if a constant amount of ink is supplied.

A second aspect of the present invention is a printing system for use with printing plate, the printing system comprising a pressure drum and at least one plate drum disposed along an outer periphery of the pressure drum; an exposure apparatus disposed for exposing a printing plate mounted on a plate drum according to digital image information representing an image and forming an image onto the printing plate; a constant amount ink supplying device disposed for supplying a substantially constant rate of ink to the plate drum; and an information processing device comprising program logic which prepares surface area modulation data based on at least one of an ink film thickness on the printing plate due to the substantially constant rate of ink and dot surface areas of the digital image information, and which produces revised image data based on the surface area modulation data, and controls the exposure apparatus to re-expose the printing plate according to the surface area modulation data.

In the printer of the second aspect, at the time when a constant amount of ink is sent to the plate drum from the ink container by the constant amount ink supplying device, by the information processing device, surface area modulation data for the time of supplying a constant amount of ink is generated in advance from the ink film thickness for each predetermined region of the digital image information. The image data is revised on the basis of the surface area modulation data, and the amount of ink is determined on the basis of this revised image data. In this way, the density of the image can be expressed by the dot surface area, and in particular, an excess amount of supplied ink can be prevented. For example, problems such as white portions being colored black can be prevented.

The constant amount ink supplying device may be a structure in which an ink discharge opening can be opened and closed in a slit form, or an ink discharge pump can be controlled.

In the printer of the second aspect, preferably, the information processing device comprises image dividing logic which divides the digital image information into dots; a film thickness/surface area detecting device which detects at least one of the ink film thickness and the dot surface area of each of the divisional dots; and image information inversely converting logic which inversely converts the digital image data on the basis of the surface area modulation data such that at least one of the film thickness and the surface area detected by the film thickness/surface area detecting device becomes at least one of a film thickness and a surface area by the constant amount of ink.

In the printer of the second aspect, preferably, the processes of the information processing device are carried out such that the division of the digital image information into the dots by the image data dividing logic is carried out first. This division into the dots is the greatest division. The film thicknesses of the divisional dots are detected by the film thickness detecting device. Surface area modulation data for obtaining dot surface areas which result in the densities of the film thicknesses are generated. The original digital image information is revised by the image information inversely converting logic.

The image information inversely converting logic may carry out determination on the basis of a predetermined function, or may generate a computational formula on the basis of experimental data. Further, the processes of an expert printing operator may be learned by fuzzy logic, and a computational formula may be generated on the basis of the results of learning.

The above description presupposes that the supplied amount of ink per unit time is constant for one image. However, in a case in which, based on the results of image analysis, it is known that there are many regions in which ink is not needed along the entire axial direction region of the plate drum, the amount of ink in the range of the one image can be adjusted.

In the above-described printing method and printing device of the present invention, an appropriate amount of ink which corresponds to gradations in density can be supplied without providing a plurality of ink keys along the axial direction of the plate drum, and merely by opening and closing a single key plate which covers the entire axial direction region of the plate drum.

DETAILED DESCRIPTION OF THE PREFERRED EMBODIMENT

Figure 1:
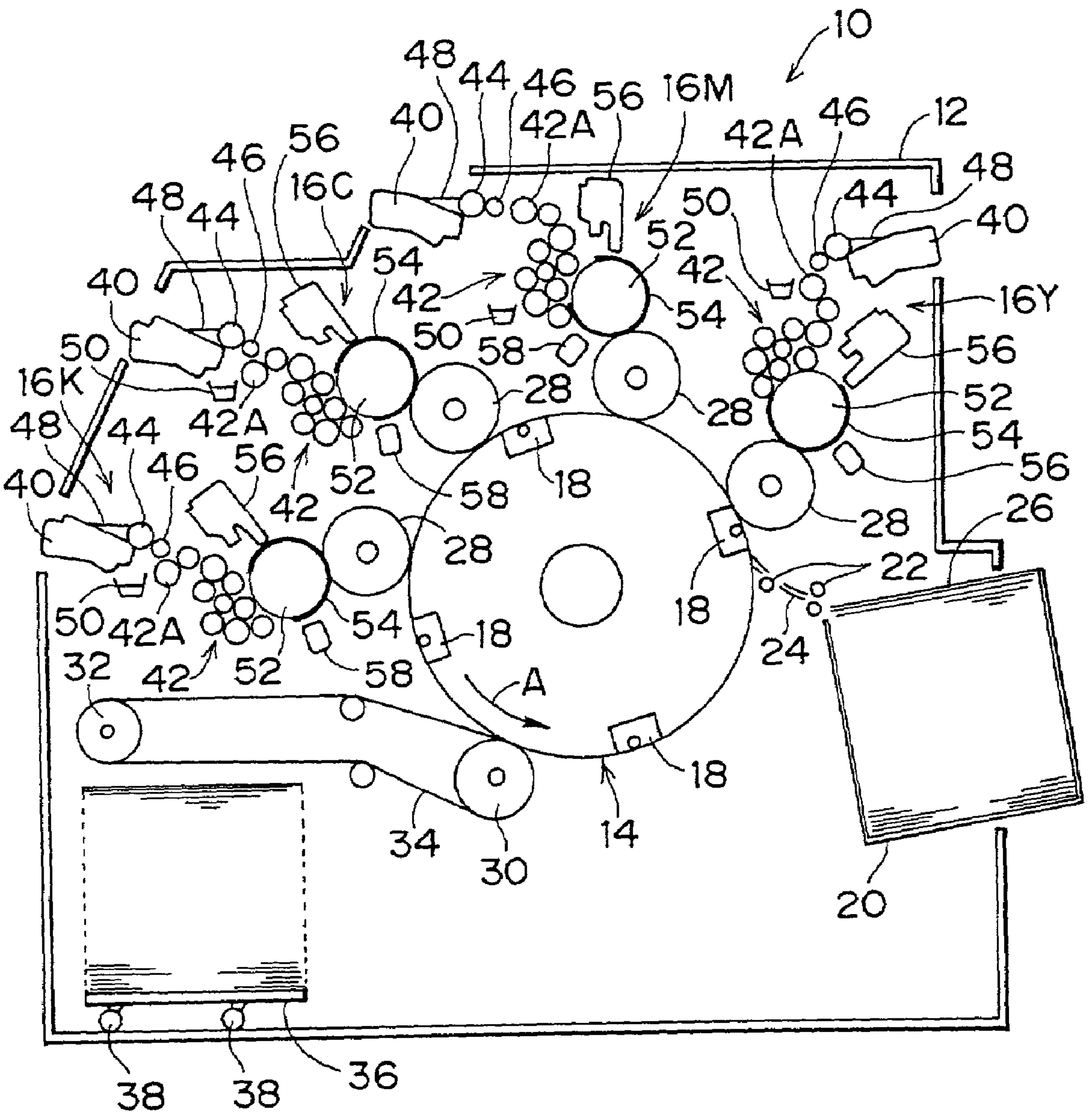
FIG. 1 is a schematic structural view of a printing device relating to an embodiment of the present invention.

A printing device 10 relating to an embodiment of the present invention is shown in FIG. 1. The printing device 10 is a device at which full color printing is possible. At the periphery of a pressure drum 14 provided within a casing 12 are provided, in order in the counterclockwise direction (the direction of arrow A in FIG. 1), a Y (yellow) color printing section 16Y, an M (magenta) color printing section 16M, a C (cyan) color printing section 16C, and a K (black) color printing section 16K. (When these respective printing sections are referred to collectively hereinafter, they are called "the printing sections 16".)

Four clips 18 are provided at uniform intervals at the pressure drum 14. The clip 18 nips the leading end of a sheet 26, which is guided and supplied from a feed tray 20 by guide rollers 22 and guide plates 24, and winds the sheet 26 around the peripheral surface of the pressure drum 14. Note that a maximum of four sheets 26 can be simultaneously wound on the peripheral surface of the pressure drum 14.

A full color image is printed by the pressure drum 14 being rotated in the direction of arrow A in FIG. 1, and inks of the respective colors being transferred from blanket rollers 28 provided in correspondence with the respective printing sections 16, such that the four colors are superposed.

The printed sheet 26 is transferred onto a conveying belt 34 which is trained around rollers 30, 32 and contacts the pressure drum 14 at the lowermost position thereof. (Namely, the sheet 26 is peeled off from the pressure drum 14.) The sheet 26 is conveyed toward a receiving stand 36. The printed sheets 26 are successively fed into and stacked at the receiving stand 36.

The receiving stand 36, into which a fixed number of the sheets 26 have been fed, is removed from the casing 12 (is moved by being rolled on casters 38), and is replaced with an empty receiving stand 36.

Next, the structure of the printing sections 16 will be described.

The printing sections 16 of the respective colors all have the same structure, and thus, here, the structure of the Y color printing section 16 will be described as an example.

Figure 2:
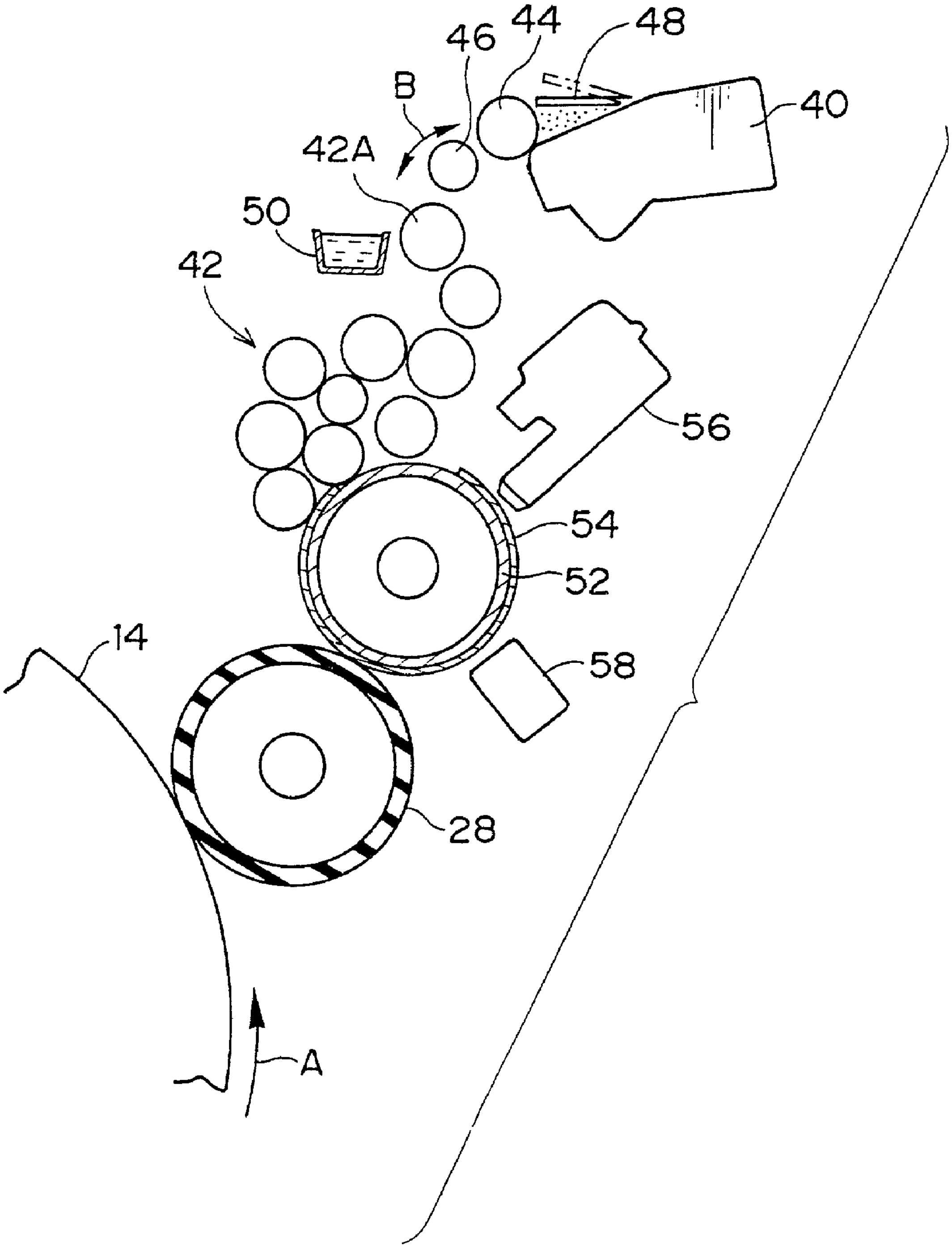
FIG. 2 is an enlarged view of the printing device.

As shown in FIG. 2, an ink container 40, in which Y color ink is stored, is provided at the Y color printing section 16. A plurality of knead-in rollers 42 are disposed at the downstream side of the ink container 40 in a state of contacting the knead-in rollers 42 adjacent thereto. Among these knead-in rollers 42, a roller 42A which is the closest to the ink container 40 is disposed such that a slight gap is provided between the roller 42A and an ink supply roller 44 provided at the ink container 40. An ink moving roller 46 is provided in this gap. Due to the driving force of a driving device (not shown), the ink moving roller 46 is moved (in the directions of arrow B in FIG. 2) so as to selectively contact one of the ink supply roller 44 and the knead-in roller 42A.

The ink in the ink container 40 is dammed up by the ink supply roller 44. When a dam plate 48, which is provided so as to correspond to the ink supply roller 44, is opened, the ink flows out from the ink container. At this time, the ink moving roller 46 is positioned at the ink supply roller 44 side and receives the ink which has flowed out. Due to movement of the ink moving roller 46 thereafter, the ink is transferred to the knead-in roller 42A.

A small amount of solution (water) is supplied from a wetting water container 50 to the knead-in rollers 42 and is mixed with the ink such that the ink becomes an appropriate viscosity. Thereafter, the ink is supplied to a plate drum 52.

Depending on the printer or the ink, the present invention is applicable to both a printing system in which water is first supplied to the plate, and thereafter ink is applied, or to a waterless printing system which does not use any water at all.

A printing plate 54 is wound on the plate drum 52, and the ink moves onto the printing plate 54.

A printing section 56 is provided at the periphery of the plate drum 52, such that an image is recorded in accordance with image data. The plate drum 52 contacts the blanket roller 28.

The printing section 56 is structured so as to repeatedly output a light beam in a main scanning direction, such that an image is recorded synchronously with rotation (subscanning) of the plate drum 52. Depending on the plate, the present embodiment may be used with methods which record by using a heat source such as a thermal heater, and it suffices for an image to be able to be formed on the plate. The printing plate 54 is a structure in which a layer of a photocatalyst substance is provided on a support which is an aluminum plate or the like, and the portions at which light is illuminated become hydrophilic layers, and water for wetting is applied thereto. Further, after ink is transferred to the blanket roller 28, by irradiating ultraviolet light from a light source section 58, the hydrophilicity of the original photocatalyst substance layer returns, such that repeated use is possible.

Figure 3:
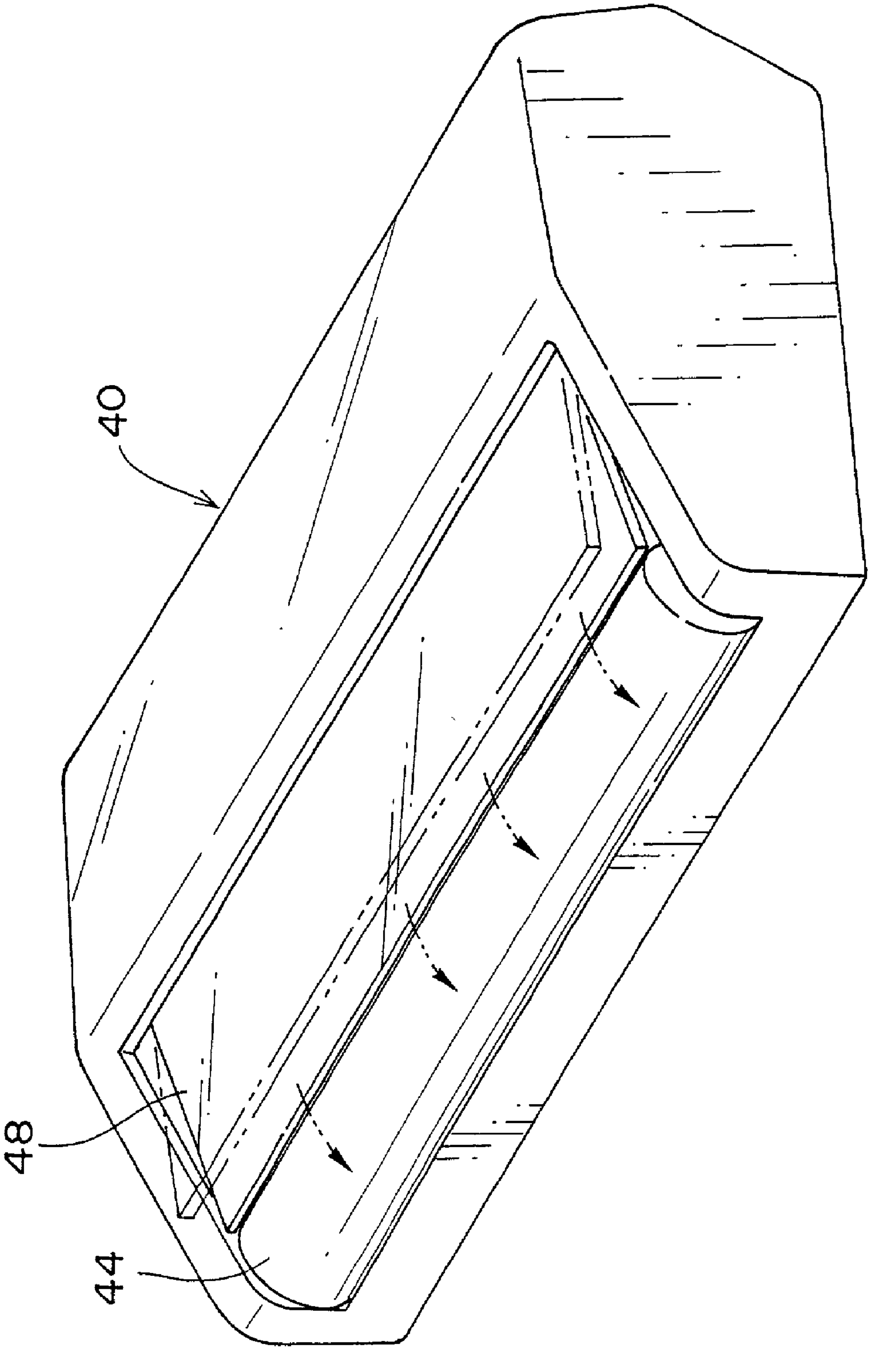
FIG. 3 is a perspective view showing the relationship between an ink container and an ink plate.

Here, as shown in FIG. 3, the ink supply roller 44 and the dam plate 48 which are mounted to the ink container 40 correspond to the entire axial direction region of the ink moving roller 46. When the dam plate 48 is opened (when the distal end portion thereof moves away from the ink supply roller 44), a uniform amount of ink flows out over the entire axial direction region. The dam plate 48 is basically set to a degree of opening which always allows a fixed amount of ink to flow out per unit time, and control of the degree of opening of the dam plate 48 is extremely simple.

Figure 4:
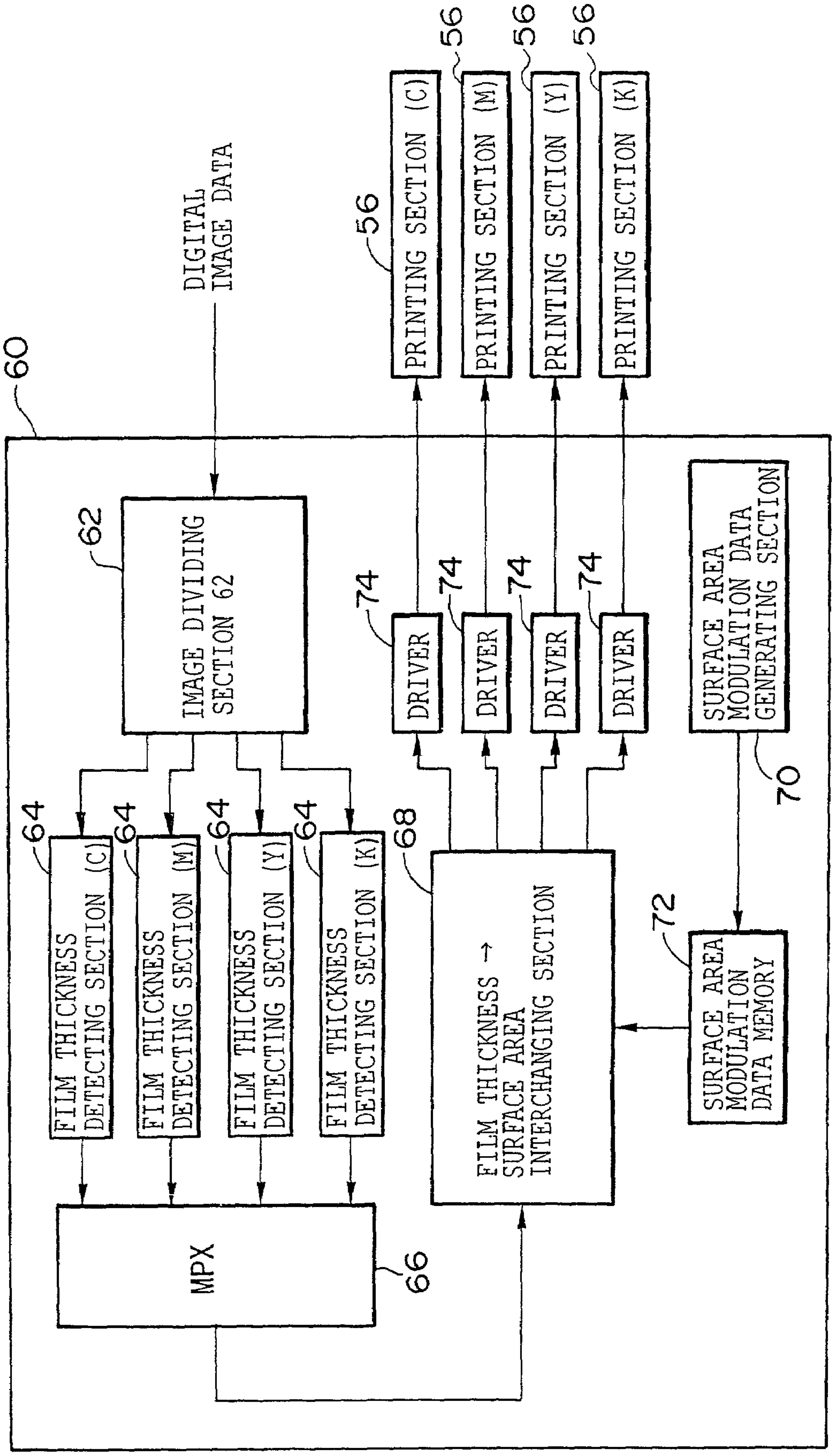
FIG. 4 is a schematic view showing a control section which carries out printing control of a printing section.

FIG. 4 is a block diagram of a control section 60 for controlling the printing section 56.

Inputted image data of the respective colors is inputted to an image dividing section 62 where the image data is divided into predetermined regions (i.e., into dots in the present embodiment). Film thicknesses corresponding to the densities are detected by film thickness detecting sections 64. Output signal wires of the respective film thickness detecting sections 64 are connected to a multiplexer 66, and data are inputted in time series to a film thickness data and surface area data interchanging section 68 (which will be called the "data interchanging section 68" hereinafter). Surface area modulation data, which is generated by a surface area modulation data generating section 70 and is stored in advance in a surface area modulation data memory 72, is inputted to the data interchanging section 68. On the basis of this surface area modulation data, the data interchanging section 68 converts the original image data into image data which conforms to surface area modulation, and outputs the converted data to drivers 74 for the respective colors (Y, M, C, K). The printing sections 56 of the respective colors are controlled on the basis of signals from the drivers 74, and images are recorded onto the printing plates 54.

Operation of the present embodiment will be described hereinafter.

First, the flow of the entire printing device 10 will be explained.

When an instruction for printing is given, the topmost sheet 26 is removed from the feed tray 20, and is guided by the guide rollers 22 and the guide plates 24 so as to arrive at the peripheral surface of the pressure drum 14. The clip 18 is provided at the peripheral surface of the pressure drum 14, and the leading end portion of the sheet 26 is nipped by the clip 18, and in this state, the pressure drum 14 is rotated in the direction of arrow A in FIG. 1. This operation is carried out four times during one rotation of the pressure drum 14. Namely, four sheets 26 are simultaneously set on the pressure drum 14.

When the pressure drum 14 rotates, first, a Y color image is transferred onto the sheet 26 at the Y color printing section 16. Namely, by opening the dam plate 48 to a predetermined degree of opening, the ink which flows out from the ink supply roller 44 onto the ink moving roller 46 is transferred to the knead-in rollers 42, and is fed from the knead-in rollers 42 onto the surface of the printing plate 54 which is wound on the plate drum 52. During this process, a small amount of water is supplied from the wetting water container 50 such that ink is supplied to the printing plate 54 at an appropriate viscosity.

At the printing section 56, a light beam is scanned in accordance with image data such that an image is recorded onto the printing plate 56. The surface of the printing plate 56 is divided into an ink receiving layer and an ink non-receiving layer in accordance with the image, and the ink adheres only onto the ink receiving layer. In this way, a Y color image is formed.

Thereafter, in the same way, an M color image is formed at the M color printing section 16, a C color image is formed at the C color printing section 16, and a K color image is formed at the K color printing section 16.

The image on each of the plate drums 52 is transferred onto the sheet 26 on the pressure drum 14 via the blanket rollers 28. At this time, the rotational positions of the respective plate drums 52 are synchronous, such that the four color images are transferred in a superposed manner onto the sheet 26, and a full color image is formed.

Next, the flow of image data at the control section 60 of the printing sections 56 will be described.

When image data is inputted, first, the image data is divided into dot units for the respective colors (at the image dividing section 62). The film thicknesses corresponding to the densities of the divisional dots are detected by the film thickness detecting sections 64.

The present embodiment is a structure in which adjustment of the film thicknesses in accordance with the densities is not possible, i.e., the dam plate 48 is a single structure. Thus, the data interchanging section 68 modulates the dot surface areas, as another device for expressing the densities.

Surface area modulating data is generated at the surface area modulating data generating section 70, and is stored in advance in the surface area modulating data memory 72. The dot surface areas are determined on the basis of the film thickness data of the respective dots. Here, there are cases in which the value of a determined dot surface area is larger than the maximum dot surface area of the divisional dots. In this case, it suffices to change the density data of an adjacent dot.

The image data which has been subjected to surface area modulation at the data interchanging section 68 (i.e., the data which has undergone surface area modulation) is sent to the printing sections 56 via the drivers 74 of the respective colors, and printing of the respective colors is carried out.

The principles of surface area modulation from the film thickness are as follows.

In a case in which the image density is to be expressed, at the printing device 10, the densities are set by the film thicknesses of the respective dots. Namely, in the case of high density, the film thickness is large, and in the case of low density, the film thickness is small. Thus, conventionally, in order to adjust the film thickness, the image was finely divided, and the amount of ink supplied was varied over time and in the subscanning direction (the axial direction of the ink moving roller) in accordance with the film thickness. In order to realize such operation, there was the need to provide the keyboard-like ink keys, which were divided along the axial direction of the ink moving roller 46, and to make the respective ink keys independently movable.

In contrast, in the present embodiment, in order to express the density by the dot surface area, a dot surface area which is equivalent to the density corresponding to the film thickness of the dot is determined, and the base image data is converted. In this way, because it suffices for the film thickness to be constant, a single dam plate 48 suffices, and a constant degree of opening suffices.

Thus, in the printing device 10 of the present embodiment, by using the film thicknesses of the respective dots obtained from the original image data, new image data which expresses densities in dot surface areas are generated on the basis of the surface area modulation data. Even if a constant amount of the ink is supplied, a full color image can be formed without uneven density. Thus, the dam plate 48 mounted to the ink container 40 can be made to be a single structure along the axial direction of the ink moving roller 46, and the structure of the device can be simplified. Further, the degree of opening of the dam plate is always a constant degree of opening, and the amount of ink supplied per unit time can be made to be a constant amount. Thus, control of the supply of ink is simple.

In the present embodiment, the conversion of the image data at the data interchanging section 68 presupposes use of a computational formula utilizing a predetermined function. However, the surface area modulation data generating section 70 may generate surface area modulation data which learns, by fuzzy logic, the work of expert or learns data based on experimentation, and the data (densities) of the respective dots can be rewritten on the basis of this nonlinear information.

Further, in the above description, the amount of ink supplied per unit time is constant. However, in a case in which it is determined, from the results of image analysis, that there are many regions which do not require ink along the entire axial direction region of the plate drum, the amount of ink in the range of one image can be adjusted. For example, in a case in which the image is a text image (e.g., letters) and is recorded only on the lower half of the sheet (the upper half of the sheet is blank), it is possible to supply ink only to the lower half of the sheet and not to the upper half.

Further, in the present embodiment, printing is carried out by using a printing plate 54, in which repeated writing and erasing of images is possible, in a state in which the printing plate 54 is set at (wound around) the plate drum 52. However, an image can be digitally exposed onto the printing plate in a separate process, and thereafter, the plate may be set at the plate drum.

Further, in the present embodiment, the divisional dots are used by the film thickness detecting sections 64 to detect film thicknesses corresponding to the densities. However, the surface areas of the dots may be detected.

Moreover, the ink film thickness at, for example, the blanket roller 28 or the like can be measured and controlled. Or, a target plate region of a constant surface area ratio which is known may be used, and the ink surface area on this plate region can be measured and controlled. Further, a target region, on the printing sheet, of a constant surface area which is known may be used, and the ink surface area thereof may be measured and controlled.

What is claimed is:

1. A method for printing an image in accordance with digital image information representing the image, the method comprising the steps of:

(a) mounting a printing plate on a plate drum;

(b) supplying ink at a substantially constant rate to the printing plate;

(c) generating surface area modulation data based on at least one dot surface areas from the digital image information, and an ink film thickness on the printing plate due to the substantially constant rate of ink;

(d) producing revised image data based on the surface area modulation data corresponding to at least one of ink supply rate for adjusting ink film thickness and dot surface areas; and (e) printing an image according to the revised image data by at least of one of adjusting ink supply rate and exposing an image on the printing plate.

2. A method according to claim 1, further comprising the step of detecting at least one of ink film thicknesses and respective dot surface areas.

3. A method according to claim 1, further comprising the step of adjusting a supply rate of ink within a range of one image.

4. A method according to claim 1, wherein each of the steps is carried out independently and synchronously for a plurality of types of inks.

5. A method according to claim 2, further comprising the step of adjusting a supply rate of ink within a range of one image.

6. A method according to claim 2, wherein each of the steps is carried out independently and synchronously for a plurality of types of inks.

7. A method according to claim 3, wherein each of the steps is carried out independently and synchronously for a plurality of types of inks.

8. The method of claim 1 wherein supplying ink at a substantially constant rate comprises disposing ink from an elongated well to dispose ink along an axial direction of a plate drum through a single opening.

9. The method of claim 8, wherein the single opening has a constant degree of opening along substantially an entire length of the elongated well.

10. A printing system for use with printing plate, the printing system comprising a pressure drum and at least one plate drum disposed along an outer periphery of the pressure drum, comprises:

an exposure apparatus disposed for exposing a printing plate mounted on a plate drum according to digital image information representing an image and forming an image onto the printing plate;

a constant amount ink supplying device disposed for supplying a substantially constant rate of ink to the plate drum; and an information processing device comprising program logic which prepares surface area modulation data based on at least one of an ink film thickness on the printing plate due to the substantially constant rate of ink and dot surface areas of the digital image information, and which produces revised image data based on the surface area modulation data, and controls the exposure apparatus to re-expose the printing plate according to the surface area modulation data.

11. A printing system according to claim 10, wherein the information processing device comprises image dividing logic which divides the digital image information into dots; a detector which detects at least one of ink film thickness and a dot surface area for each dots; and image information inversely converting logic which inversely converts the digital image data on the basis of the surface area modulation data such that at least one of the film thickness and the surface area detected by the detecting device becomes at least one of a film thickness and a surface area due to the substantially constant ink supply rate.

12. A printing system according to claim 10, further comprising another plate drum, wherein the plate drums correspond to the different types of ink from one another.

13. A printing system according to claim 10, wherein the constant amount ink supplying device includes rollers and an ink key, and the ink key consists essentially of a single structure along an axial direction of the roller, and having an opening for allowing ink to flow out at a substantially constant rate.

14. A printing system according to claim 10, further comprising: a viscosity adjusting section which, before the ink is supplied to the plate drum, adjusts viscosity of the ink.

15. A printing system according to claim 11, further comprising another plate drum, wherein the plate drums correspond to the different types of ink from one another.

16. A printing system according to claim 11, wherein the image information inversely converting logic includes a data interchanging and modulation data generating logic sections.

17. A printing system according to claim 12, wherein the constant amount ink supplying device includes rollers and an ink key, and the ink key consists essentially of a single structure along an axial direction of the roller, and having an opening for allowing ink to flow out at a substantially constant rate.

18. A printing system according to claim 12, further comprising: a viscosity adjusting section which, before the ink is supplied to the plate drum, adjusts viscosity of the ink.

19. A printing system according to claim 16, wherein the constant amount ink supplying device includes rollers and an ink key, and the ink key consists essentially of a single structure along an axial direction of the roller, and having an opening for allowing ink to flow out at a substantially constant rate.

20. A printing system according to claim 16, further comprising: a viscosity adjusting section which, before the ink is supplied to the plate drum, adjusts viscosity of the ink.

21. The system of claim of claim 10, wherein the constant amount ink supplying device comprises an elongated well to dispose ink along an axial direction of a plate drum through a single opening.

22. The system of claim 21, wherein the single opening has a constant degree of opening along substantially the entire length of the elongated well.

23. A printing system for use with printing plates, the printing system comprising a pressure drum and at least one plate drum disposed along an outer periphery of the pressure drum, comprises:

an ink supplying device which supplies an ink to the plate drum;

an information processing device comprising program logic which prepares surface area modulation data based on at least one of an ink film thickness for when on a printing plate is mounted on the plate drum with ink supplied thereof, and dot surface areas of digital image information representing an image for printing, and which produces revised image data on the basis of the surface area modulation data; and a printing section controlled on the basis of the surface area modulation data.

24. A printing system according to claim 23, wherein plural types of inks can be utilized.

25. The system of claim 23, wherein the ink supplying device supplies ink to the plate drum at a substantially constant rate.

26. The system of claim 25, wherein the ink supplying device comprises an elongated well to dispose ink along an axial direction of a plate drum through a single opening running substantially an entire length of the elongated well at a constant degree of opening.

* * * * *